3,499,768
COLD-SET MILK DESSERTS AND COMPOSITIONS
THEREFOR AND METHOD OF MAKING SAME
Arthur L. Moirano, Mountainside, N.J., assignor to Marine Colloids, Inc., Springfield, N.J., a corporation of Delaware
No Drawing. Filed Feb. 23, 1967, Ser. No. 617,857
Int. Cl. A23l 1/04
U.S. Cl. 99—139                 16 Claims

ABSTRACT OF THE DISCLOSURE

Carrageenan, of which the lambda fraction constitutes at least 70% has the property of providing a cold-set milk pudding when present therein so as to constitute about 1 to about 6 grams per pint of milk. The pudding properties may be varied by the addition of one or more of spray dried fat, powdered cheese, and a tetra alkali metal pyrophosphate.

BACKGROUND OF THE INVENTION

Field of the invention

This invention relates to cold-set milk desserts and to compositions therefor and methods of making such desserts and compositions. It is concerned more especially with cold set milk desserts having the consistency of a creamy pudding, a gelled pudding, a whipped pudding or a cheesecake.

Description of the prior art

In the past various milk-base desserts have been prepared with the initial aid of heat to promote solution of one or more of the ingredients in the milk that is used and to accomplish cooking, if cooking is necessary. Thickening or gelling is induced upon cooling the dessert to atmospheric or sub-atmospheric temperature. For example, a milk pudding can be prepared by mixing a starch-containing material such as cornstarch with milk, cooking until the starch is gelatinized and cooling in a refrigerator. More recently commercial products have been introduced such that heating or cooking may be dispensed with. Such puddings or desserts are commonly referred to, and are referred to herein, as "cold-set."

One type of cold-set milk pudding which has heretofore been proposed utilizes pre-gelatinized starch and an alkali pyrophosphate. Pre-gelatinized starch when dispersed in cold milk becomes hydrated with accompanying development of increased consistency that is somewhat pasty. In order to develop a more acceptable consistency, the pre-gelatinized starch is used with an alkali pyrophosphate such as tetrasodium pyrophosphate which has the capacity to develop a gel structure in milk. It also has been proposed to employ an alkali orthophosphate such as disodium phosphate to accelerate the set. Suitable alkali pyrophosphates are disclosed in Patent 2,801,924, the tetrasodium and tetrapotassium pyrophosphates being preferred. Salts such as alkali orthophosphates also are disclosed in said patent for accelerating the setting of the cold mix pudding. For example, a pudding may be prepared from a dry mix containing pre-gelatinized starch, tetrasodium pyrophosphate and another phosphate together with other ingredients such as sugar, flavoring material, coloring material, etc., as may be desired. The pudding is prepared by adding the dry mix to a given quantity of cold milk which thereupon is agitated with a suitable beater such as a hand beater or an electric mixer for a period of 1 or 2 minutes in order to thoroughly disperse the dry ingredients in the milk. The mixture is then allowed to stand until it has become sufficiently set for consumption. When an accelerating phosphate is employed, the setting can be adequately accomplished in approximately 10 to 15 minutes.

Cold-set puddings of the "instant" type above referred to are not altogether satisfactory. Thus they are regarded as suffering primarily from a strong tendency to mask flavor. They also are prone to develop excessive syneresis and the complaint is made that there is some off-flavor development. Improper balance of phosphate gelling salts may also result in excessive stiffening on standing. Moreover, the texture of such cold-set puddings is not equal to that of conventional cooked starch puddings and from a dietary standpoint the relatively high concentration of starch results in increased caloric value which often may be regarded as undesirable.

Carrageenan has known properties as a thickening and gelling agent. The most widely used carrageenan is derived from red seaweeds such as *Chondrus crispus*. If attempt is made to use carrageenan of the type recovered from *Chondrus crispus* in the preparation of a cold-set pudding or other dessert, difficulties are encountered due to the fact that the carrageenan particles remain insoluble and merely become swollen, with the resultant unsightly development of what commonly are referred to as "fish eyes." Moreover, the lack of sufficient solubility is accompanied by insufficient gelling effect.

Carrageenan derived from a seaweed such as *Chondrus crispus* is sensitive to the presence of cations in that in the presence of certain cations a strong gel is obtainable whereas in their absence there is little or no gelling effect. *Chondrus crispus* (Irish moss) is particularly sensitive to the presence of potassium cations. Other seaweeds whose extracts exhibit similar potassium-sensitivity are *Chondrus ocellatus, Gigartina stellata* and *Eucheuma cottonii*. The types of carrageenan derived from red seaweeds such as *Eucheuma spinosum* and Agardhiella have greater sensitivity to calcium than to potassium, but the difficulties encountered in using such seaweeds for the preparation of a cold-set milk pudding are essentially the same as those referred to above when attempting to employ a potassium-sensitive carrageenan.

It has been ascertained heretofore that certain potassium-sensitive carrageenans derived from seaweeds such as *Chondrus crispus, Chondrus ocellatus* and *Gigartina stellata* contain two carrageenan components to which the names kappa carrageenan and lambda carrageenan have been applied. For example, carrageenan extracted from a seaweed such as *Chondrus crispus* contains on the average 60% of kappa carrageenan and 40% of lambda carrageenan. A procedure for separating and respectively recovering the kappa and lambda components of carrageenan is disclosed in Patent 3,176,003. The other seaweed varieties mentioned above are unsuited for use according to this invention because *Eucheuma cottonii* consists substantially entirely of kappa carrageenan and because *Eucheuma spinosum* and Agardhiella possess such calcium-sensitivity that they cannot be separated into kappa and lambda components by the separation procedure of said Patent 3,176,003. However, if the lambda could be separated it could be used in the practice of this invention.

The kappa and lambda components of carrageenan are significantly different in composition and properties. Kappa carrageenan is primarily composed of alternating 3,6-anhydro-d-galactose and sulfated d-galactose units and is characterized by its sensitivity to metallic cations such as potassium, ammonium, calcium and many other divalent and trivalent cations as regards the effect of such cations in greatly enhancing the gel-forming properties of the kappa carrageenan. Because of the presence in milk of cations which exercise an insolubilizing effect on kappa carrageenan, namely, calcium and likewise some potassium, kappa carrageenan is insoluble in cold milk.

Lambda carrageenan is composed primarily of sulfated d-galactose units and contains a very slight amount or none of the 3,6-anhydro-d-galactose structure which is comprised in kappa carrageenan. The difference in chemical composition is attended with greatly differing properties since lambda carrageenan is virtually insensitive to those cations which react strongly with kappa carrageenan to induce insolubility and gelation in aqueous media. Lambda carrageenan can, therefore, be dissolved in cold water even in the presence of a substantial quantity of the metallic cations referred to hereinabove.

SUMMARY OF THE INVENTION

It is an object of this invention to provide a cold-set milk pudding or other cold-set milk dessert that has improved properties as regards minimization of flavor masking and of content of ingredients that impart an off-flavor taste.

It is a further object of this invention to provide a cold-set milk pudding or other cold-set milk dessert that is substantially free of objectionable tendency to stiffen on standing after the initial set has occurred.

It is a further object of this invention to provide a cold-set milk pudding that is substantially free of objectionable syneresis.

It is a further object of this invention to provide a cold-set milk pudding or other cold-set milk dessert that lends itself to low caloric formulation for dietetic uses.

It is a further object of this invention to provide cold-set milk puddings having improved consistency and mouth feel.

It is a further object of this invention to provide a cold-set milk pudding or other cold-set milk dessert utilizing a carrageen-based system.

It has been found according to this invention that it is possible to provide a desirable cold-set milk pudding or other cold-set milk dessert by utilizing carrageenan which, to the extent of at least 70% by weight, consists of lambda carrageenan. More specifically, while lambda carrageenan is insensitive to the gelling effect of cations, it has been found that when lambda carrageenan is dispersed in a cold milk system it has the capacity of reacting with the casein present in the milk to afford a complex which results in a desirable consistency for a milk pudding or other dessert. To the extent that particles of lambda carrageenan remain in hydrated or swollen condition, they do not have the objectionable fish eyes appearance and actually contribute to producing a desirable mouth feel. By the employment of the lambda carrageenan it is possible to obtain a desirable dessert consistency without the employment of starch and also without the employment of a gelling salt such as tetrasodium pyrophosphate which heretofore had been regarded as necessary both with starch and with carrageenan cold-set milk puddings. The lambda carrageenan is unlike the kappa carrageenan in this significant respect.

It also has been found that by employing lambda carrageenan to form a gel with milk, a superior cold-set milk pudding or other cold-set milk dessert may be provided as compared with cold-set milk puddings and desserts based on the starch-phosphate combination in that there is less masking of flavor as well as freedom from off-flavor. The new cold-set milk pudding and other cold-set milk desserts likewise are desirable since they do not stiffen appreciably with age. The new mild pudding of this invention likewise is substantially free of syneresis upon standing. It likewise lends itself excellently to low caloric dietetic desserts and enables cold-set puddings and other desserts to be prepared so as to have superior controlled consistency.

The carrageenan should contain more than 70% of lambda carrageenan, for to the extent that kappa carrageenan may be present it is insoluble in milk. While up to about 30% can be present without excessive occurrence of objectionable fish eyes, the content of any kappa carrageenan should be substantially less than 30%. In preferred practice the lambda carrageenan constitutes at least about 75% by weight of the total carrageenan.

It is a further feature of this invention that the effectiveness of lambda carrageenan in providing a cold-set milk pudding or other cold set milk dessert is greatly enhanced by reducing the lambda carrageenan to a very fine state of sub-division. Thus when employing this feature of the invention the particle size of the carrageenan that is added to the cold milk is reduced so that the particles will pass a standard 200-mesh testing screen. Even a greater state of sub-division, namely, so as to pass a 250-mesh standard testing screen, is preferable, for the smaller the particle size the more effectively the lambda carrageenan functions in providing desirable consistency in a cold-set milk pudding or other dessert. The screen sizes referred to herein and in the claims are those of standard testing screens according to American Society of Testing Methods, Standard Screen Series.

The desired state of sub-division of the carrageenan may be effected by grinding the dried extract. Alternatively, it is possible to reduce the particle size of carrageenan so as to be of the order aforesaid to co-dry the carrageenan with other ingredients such as sugars and dextrines. The production in this way of particles of the small particle size aforesaid may be accomplished in any desired way as, for example, roll drying, spray drying, freeze drying, foam mat drying, and alcohol co-precipitation.

When using the separating procedure of Patent 3,76,003 the lambda carrageenan may be obtained from seaweed varieties such as *Chondrus crispus, Chondrus ocellatus* and *Gigartina stellata*. However, there are certain seaweed varieties such as *Gigartina acicularis* and *Gigartina pistillata* from which carrageenan may be extracted which contains approximately 75% or more by weight of the lambda type carrageenan.

The amount of carrageenan that is employed depends to a large extent on the desired consistency of the cold-set milk dessert. Thus the lambda carrageenan may be present in an amount ranging from about 1 gram to about 6 grams per pint of milk. The weight of the lambda carrageenan is the weight of the lambda component of the carrageenan which is employed, which carrageenan, as aforesaid, should contain at least 70% by weight of the lambda carrageenan.

DESCRIPTION OF THE PREFERRED EMBODIMENTS

More specifically, a typical base for cold set milk desserts is one containing about 4 grams of lambda carrageenan and 51 grams sugar per pint of milk. There may be incorporated with this base a variety of other materials to provide color and flavor, e.g. chocolate, vanilla, banana, etc., in combination with a non-toxic coloring material. The presence of about 10 to about 30 grams, and preferably about 20 grams, of milk solids is desirable in that this additional source of calcium enhances the set. An equivalent result cannot be obtained by the employment of a soluble calcium salt such as calcium chloride.

EXAMPLE 1

The following is a typical formulation suitable for a milk pudding:

| | | |
|---|---|---|
| Sugar | grams | 55 |
| Lambda carrageenan | do | 4 |
| Milk solids | do | 20 |
| Milk | pints | 1 |
| Flavoring and coloring material | | As desired |

The foregoing formulation is illustrative of preferred practice of this invention with inclusion of milk solids. However, one may, if desired, omit the milk solids and obtain a satisfactory cold set milk pudding having a somewhat softer consistency.

In this example and the others the components other than the milk in the stated relative proportions in parts by weight are made up in dry solid, finely particulate form, the carrageenan preferably being especially finely divided, e.g. passing a 250-mesh testing screen.

The preparation of the milk pudding consists simply in adding the dry ingredients to the milk followed by agitation by means of an electric mixer or hand beater so as to disperse the carrageenan in the milk. The mixing action normally requires a period of only about 1 minute. However, if desired, the ingredients may be subjected to more severe mixing action by increasing the speed or the time of the mixing and thereby obtain a whipped type pudding or semi-solid cream. After standing, the pudding is ready to be consumed.

As has been brought out hereinabove, it has been found, according to this invention, that lambda carrageenan, without more, has the capacity to provide a cold set milk pudding of desirable consistency. However, if desired, the gelling capacity of tetrasodium pyrophosphate in milk may be utilized to modify the consistency of the pudding so as to be somewhat stiffer than when lambda carrageenan is employed by itself. A salt such as sodium orthophosphate also may be employed to accelerate the setting properties of the tetrasodium pyrophosphate. The tetrasodium pyrophosphate by itself tends to form an excessively weak gel in milk but may be employed to advantage in conjunction with the lambda carrageenan and the consistency preferred by most consumers is afforded by the combined gelling effects of the lambda carrageenan and tetrasodium pyrophosphate. The tetrasodium pyrophosphate also is conducive to better unmolding properties. On the other hand, when the lambda carrageenan serves as the gelling agent in the absence of tetrasodium pyrophosphate the pudding or other dessert may be frozen and thereafter brought back to room temperature without adverse effect whereas this cannot be done when a substantial proportion of the tetrasodium pyrophosphate is present. If some kappa carrageenan is present with the lambda carrageenan, the amount thereof that may be tolerated is enhanced by the presence of the tetrasodium pyrophosphate. The presence of the kappa carrageenan constituting at least 1% of the total carrageenan in conjunction with tetrasodium pyrophosphate has a modifying effect on consistency which can be availed of as desired to control consistency. When tetrasodium pyrophosphate is employed it constitutes from about 0.5 gram to about 4.0 grams per pint of milk.

EXAMPLE 2

The following is a typical example of a milk pudding which includes tetrasodium pyrophosphate:

| | | |
|---|---|---|
| Sugar | grams | 55 |
| Lambda carrageenan | do | 4 |
| Tetrasodium pyrophosphate | do | 1 |
| Milk solids | do | 20 |
| Milk | pints | 1 |
| Flavoring and coloring ingredients | | As desired |

As with Example 1, the inclusion of the milk solids represents preferred practice of the invention and may be omitted if a somewhat softer consistency is desired.

The pudding preparation is similar to that described in connection with Example 1. The resulting pudding is of slightly stiffer consistency as compared with that of Example 1.

In the case of a simple milk pudding as described above, the essential ingredients are the milk and the lambda carrageenan with or without the addition of tetrasodium pyrophosphate. Substances, such as sugar, may be omitted or replaced by a less caloric sweetening agent suitable for a dietic dessert.

In addition to the ingredients of the relatively simple cold set milk puddings hereinabove described, other ingredients may be added to provide cold set milk desserts of modified consistency. One such additional ingredient which may be employed in the production of desirable cold set milk desserts is spray-dried emulsified fat.

Spray-dried emulsified fat is a known product that is composed of fat, an emulsifier or combination of emulsifiers and a carrier such as sodium caseinate that enables the spray-dried fat-containing particles to be recovered in dry form. Typical emulsifiers are glyceryl lacto-palitate, glyceryl lacto-stearate, propylene glycol monostearate and glyceryl lacto-oleate. One of the known uses of spray-dried emulsified fat is that of providing a dry particulate material which when reconstituted with water will resemble cream. The fats most commonly comprised in spray-dried emulsified fats are hydrogenated vegetable oils such as coconut oil, cottonseed oil, palm oil, safflower seed oil and corn oil, etc. The fat usually constitutes from about 50% to about 75% by weight of the combined weight of the fat and the carrier.

When the spray-dried emulsified fat is employed, with dessert has enhanced capacity to become whipped to provide a whipped type instant pudding which is ready to be consumed substantially upon completion of the whipping. When the carrageenan consists substantially entirely of lambda carrageenan it has been found that the physical properties of the whipped pudding may be enhanced by the addition to the milk of potassium cations in an amount ranging from about 0.4 gram to about 1.6 grams of potassium cations per pint of milk. The beneficial effect of the potassium is not understood since the lambda carrageenan is not sensitive to potassium cations. Moreover, in the absence of the added emulsified fat in the amounts above mentioned the addition to the milk of cations other than sodium is avoided because their presence is attended with the disadvantage of rendering more insoluble any carrageenan of the kappa type that may be present. However, in the case of the whipped pudding of this invention with its content of emulsified fat, the properties of the finished pudding are substantially enhanced by the addition to the milk of a non-toxic potassium salt such as potassium chloride, potassium citrate, etc., provided the carrageenan consists substantially entirely of lambda carrageenan.

The consistency of the whipped type pudding may be varied considerably depending on the fat content of the pudding. When the fat content is relatively high, namely, of the order of 20 to 80 grams per pint of milk, the consistency of the pudding is such that the pudding, by whipping, can be caused to become highly aerated. For example, if a commercial unit is desired adapted to provide one pint of finished whipped pudding, the amount of milk normally will be approximately one-half pint (one cup) since, as the result of the aeration, the volume becomes approximately doubled. The quantity of fat referred to above and elsewhere in the specification and in the claims has reference to the quantity of fat such as which becomes dispersed in emulsified state in the milk pudding apart from the carrier and emulsifier which, of course, are also present in the pudding. When the fat content is relatively high, as aforesaid, the consistency of the pudding is such that it it ready to be consumed substantially immediately, although the consistency will firm up to some extent upon standing for a few minutes and cooling.

By the employment of a lesser quantity of fat, namely, 5 to 20 grams per pint of milk, a cold-set pudding may be provided that is of creamy consistency and that is only slightly aerated, the consistency in some respects resembling that of ice cream.

If desired, the pudding formulation of the whipped type may contain from about 0.5 to 4.0 grams of tetrasodium pyrophosphate per pint of milk, although its presence is not essential. However, in the case of a pudding wherein the fat content is of the order of 5 to 20 grams per pint of milk, the tetrasodium pyrophosphate imparts some increase in the consistency of the dessert. For higher fat contents the tetrasodium pyrophosphate exercises very little effect on consistency and normally is omitted. When the carrageenan that is used consists substantially entirely of lambda carrageenan, tetrapotassium pyrophosphate may be used instead of or in addition to tetrasodium pyrophosphate and thereby obtain under these special conditions the peculiar benefit of potassium cations that has been mentioned above.

EXAMPLE 3

The following is a typical formulation for a cold set milk pudding of the whipped type:

| | |
|---|---|
| Sugar | grams 50 |
| Lambda carrageenan | do 4 |
| Fat | do 10 |
| Milk | pints 1 |
| Flavoring and coloring ingredients | As desired |

As in Example 1, the dessert is prepared by dispersing the solid ingredients in the milk. However, for this type of dessert the mixing is normally of such severity as to impart a whipped consistency. As soon as the whipping has been accomplished the dessert is ready to be consumed, preferably after standing for only about 5 to 10 minutes or so.

If in the foregoing formulation the fat content of the pudding is increased so as to be about 50 grams, the pudding readily becomes aerated upon whipping so as to provide 2 pints of pudding which is ready to be consumed virtually immediately.

For the whipped type dessert the essential ingredients per pint of milk are from 1.0 to 5.0 grams of lambda carrageenan and from 5 to 80 grams of fat comprised in emulsified fat. The presence of from .5 to 4.0 grams of tetraalkali metal phosphate is optional.

Another type of dessert which may be produced when utilizing milk containing the lambda carrageenan as a gelling agent is cheesecake. The ingredients hereinabove mentioned in connection with a dessert of the whipped type comprising spray-dried emulsified fat may be supplemented by from about 20 grams to about 60 grams of powdered cheese per pint of milk. In the presence of the cheese the consistency of the mixed material is very greatly altered as compared with the milk puddings hereinabove described in the whipped or unwhipped condition. Any cheese which is in powdered form for dry blending may be employed. The powdered cheese that is employed in usual practice of the invention is a spray-dried cheese such as the spray-dried cheese sold by the Borden Company under the trademark E-Z cheeze.

The presence of the cheese in the mixture has been found to exercise a very great effect in the curd structure whereby the mixed ingredients acquire the consistency of cheesecake that very closely resembles in texture and taste conventional cheesecake as supplied by bakeries. The presence of the emulsified fat has a controlling effect on the wetness of the cheesecake, the cheesecake becoming wetter as the content of emulsified fat is decreased. In the preparation of the cheesecake type of dessert, unlike the others hereinabove mentioned, the presence of from about 1 gram to about 3 grams per pint of milk of tetrasodium pyrophosphate is essential in order that a desirable cheesecake consistency may be had.

EXAMPLE 4

The following illustrates a typical cold set cheesecake according to this invention:

| | | |
|---|---|---|
| Cane sugar | grams | 21.0 |
| Dextrose | do | 11 |
| Spray-dried buttermilk powder | do | 40 |
| Spray-dried cheese | do | 48 |
| Fat | do | 26.5 |
| Carrageenan containing 75% by wgt. lambda carrageenan | grams | 5.6 |
| Tetrasodium pyrophosphate | do | 2.0 |
| Milk | pints | 1 |
| Coloring and flavoring material | | As desired |

In preparation of a cold-set cheesecake, the foregoing ingredients are added to the milk in a suitable mixing bowl. The mixture is beaten with an electric mixer until the ingredients appear to be blended and mixing is continued at moderate speed for a short time, such as 3 minutes. Upon placing the mixed material in a suitable container and after refrigeration for about 1 hour a cold-set cheesecake of very desirable consistency and flavor is provided.

The essential ingredients of the cheesecake formulation of this invention per pint of milk are from about 1.5 to 4.5 grams of lambda carrageenan, from 5 to 30 grams of fat comprised in spray-dried emulsified fat, from 20 to 60 grams of spray-dried cheese, and from 1 to 3 grams of tetrasodium pyrophosphate. In the formulation of the foregoing example the sugar, dextrose and buttermilk powder serve primarily as sweetening and flavoring ingredients and may be dispensed with or replaced in whole or in part with other ingredients serving a similar general function.

In the foregoing formulations whole milk ordinarily is employed. However, skimmed milk, evaporated milk, or reconstituted dried milk also may be used.

I claim:

1. A cold-set milk pudding comprising milk having carrageenan dispersed therein as a gelling agent, said carrageenan consisting of at least 70% by weight of lambda carrageenan and the lambda carrageenan comprised in said carrageenan being present in an amount from about 1 gram to about 6 grams per pint of milk.

2. A cold-set milk pudding according to claim 1 which contains per pint of milk from 10 to 30 grams of milk solids in addition to those contained in the pint of milk.

3. A cold-set milk dessert according to claim 1 which contains from 0.5 gram to about 4.0 grams of tetrasodium pyrophosphate per pint of milk.

4. A cold-set milk pudding according to claim 3 wherein at least 1% by weight of the total carrageenan is kappa carrageenan.

5. A cold-set milk pudding according to claim 1 which comprises per pint of milk from about 5 grams to about 80 grams of emulsified fat.

6. A cold-set milk pudding according to claim 5 wherein the carrageenan content consists substantially entirely of lambda carrageenan and which comprises per pint of milk from about 0.4 gram to about 1.6 grams of potassium cations.

7. A cold-set milk pudding according to claim 5 which contains from about .5 gram to about 4.0 grams of tetrasodium pyrophosphate.

8. A cold-set dessert of cheesecake consistency which comprises milk having carrageenan dispersed therein as a gelling agent, said carrageenan consisting of at least 70% by weight of lambda carrageenan and the lambda carrageenan comprised in said carrageenan being present in an amount from about 1 gram to about 4.5 grams per pint of milk and which comprises per pint of milk from about 5 grams to about 30 grams of emulsified fat, about 20 grams to about 60 grams of dispersed cheese, and from about .5 gram to about 4 grams of tetraalkali metal pyrophosphate wherein the alkali metal is selected from sodium and potassium.

9. A solid composition which when dispersed in cold milk provides a cold-set dessert, said composition comprising in combination a milk-dispersible flavoring material and carrageenan that consists essentially of carrageenan that passes a standard 200-mesh testing screen and that consists of at least 70% by weight of lambda carrageenan, and providing a cold-set milk pudding when it is dispersed in cold milk in an amount such that the lambda carrageenan content thereof is from about 1 gram to about 6 grams per pint of milk.

10. A composition according to claim 7 wherein said carrageenan consists of at least 75% by weight of lambda carrageenan.

11. A solid composition according to claim 9 which comprises in the following relative proportions by weight

| | Parts |
|---|---|
| Lambda carrageenan | 1–6 |
| Milk solids | 10–30 |

12. A solid composition according to claim 9 which comprises in the following relative proportions by weight

| | Parts |
|---|---|
| Lambda carrageenan | 1–6 |
| Tetrasodium pyrophosphate | .5–4 |

13. A solid composition according to claim 12 wherein said carrageenan comprises kappa carrageenan in an amount ranging from 1% to 29% by weight.

14. A solid composition according to claim 9 which comprises in the following relative proportions by weight

| | Parts |
|---|---|
| Lambda carrageenan | 1–6 |
| Fat (contained in spray-dried emulsified fat) | 5–80 |

15. A solid composition according to claim 14 which comprises particles comprising a water-soluble, non-toxic potassium salt and wherein the carrageenan consists substantially entirely of lambda carrageenan.

16. A solid composition which when dispersed in cold milk provides a cold-set cheesecake, said composition comprising carrageenan consisting essentially of carrageenan that passes a 200-mesh standard testing screen and that consists of at least 70% by weight thereof of lambda carrageenan and said composition comprising in the following relative proportions by weight

| | Parts |
|---|---|
| Lambda carrageenan | 1–4.5 |
| Fat (comprised in spray-dried emulsified fat) | 5–30 |
| Spray-dried cheese | 20–60 |
| Tetrasodium pyrophosphate | 1–3 |

References Cited

UNITED STATES PATENTS

| 3,176,003 | 3/1965 | Stancioff | 99—139 |
| 3,342,612 | 9/1967 | Foster et al. | 99—131 |

MAURICE W. GREENSTEIN, Primary Examiner

J. M. HUNTER, Assistant Examiner

U.S. Cl. X.R.

99—131

PO-1050
(5/69)

UNITED STATES PATENT OFFICE
CERTIFICATE OF CORRECTION

Patent No. 3,499,768  Dated March 10, 1970

Inventor(s) Arthur L. Moirano

It is certified that error appears in the above-identified patent and that said Letters Patent are hereby corrected as shown below:

Col. 4, line 3, "mild" should be --milk--;

line 42, "3,76,003" should be --3,176,003--.

Col. 6, line 13, "dietic" should be --dietetic--;

line 36, "with" should be --the--;

line 73, "such as" should be --as such--.

Col. 7, line 1, "are also" should be --also are--;

line 68, "cheeze" should be --cheese--.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents